United States Patent [19]
Kastner

[11] Patent Number: 4,580,472
[45] Date of Patent: Apr. 8, 1986

[54] CUTTING TOOL WITH INTERCHANGEABLE TOOL HEAD FOR MACHINE TOOLS

[76] Inventor: Hermann L. Kastner, Osterholzallee 89, 7140 Ludwigsburg, Fed. Rep. of Germany

[21] Appl. No.: 633,254

[22] Filed: Jul. 23, 1984

[30] Foreign Application Priority Data

Jul. 23, 1983 [DE] Fed. Rep. of Germany ....... 3326567

[51] Int. Cl.$^4$ ............................................. B23B 29/12
[52] U.S. Cl. ......................................... 82/37; 407/95; 409/233; 279/1 DC
[58] Field of Search ........................ 82/36 R, 36 A, 37; 408/239 A; 409/233; 407/95; 279/51-53, 1 BC, 1 DC, 46

[56] References Cited

U.S. PATENT DOCUMENTS

| | | | |
|---|---|---|---|
| 3,975,984 | 8/1976 | Simmons | 279/51 |
| 4,011,791 | 3/1977 | Lanzenberger | 409/233 |
| 4,220,061 | 9/1980 | Tsukiji | 82/36 R |
| 4,270,422 | 6/1981 | Andersson | 82/36 R |
| 4,406,195 | 9/1983 | Kruger et al. | 82/36 R |
| 4,499,800 | 2/1985 | Stahl | 82/36 R |

FOREIGN PATENT DOCUMENTS

664965 9/1938 Fed. Rep. of Germany ........ 407/95
884879 11/1981 U.S.S.R. ........................... 279/1 DC

*Primary Examiner*—Leonidas Vlachos
*Attorney, Agent, or Firm*—Joseph A. Geiger

[57] ABSTRACT

A cutting tool assembly comprising a tool holder with a clamping collet and an interchangeable tool insert with a clamping shaft engageable by the clamping collet, matching conical surfaces on the periphery of the tool holder and of the tool insert providing centering as well as axial and radial force transmitting functions, while cooperating spline profiles on the assembly components provide a separate tangential force transmitting function. The clamping collet and the clamping shaft engage each other with multiple conical coupling faces which, under a pulling action of a rod connected to the collet, produce an axial pull on the tool insert while spreading radially between the clamping shaft and the tool holder to produce a radial wedging action. These conical coupling faces may be part of axially spaced identical ridges, the clamping collet expanding radially to clear the ridges for insertion, or they may be flanks of cooperating threads, the clamping collet being rotatable. Segmentation of the threads and an axial abutment reduce the rotational insertion movement.

1 Claim, 18 Drawing Figures

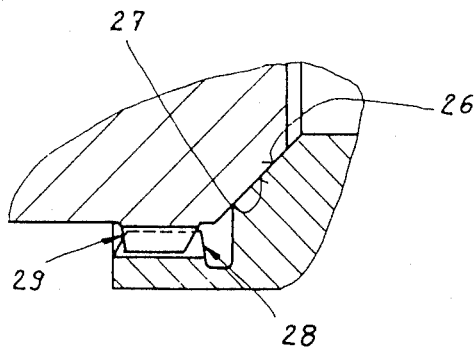
Fig. 3
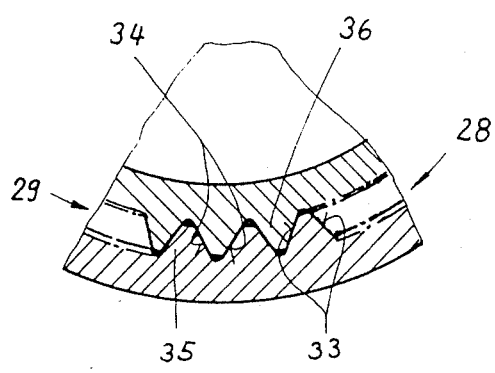
Fig. 4
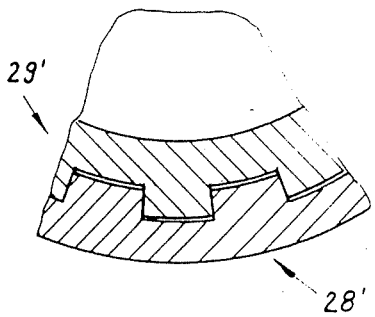
Fig. 5
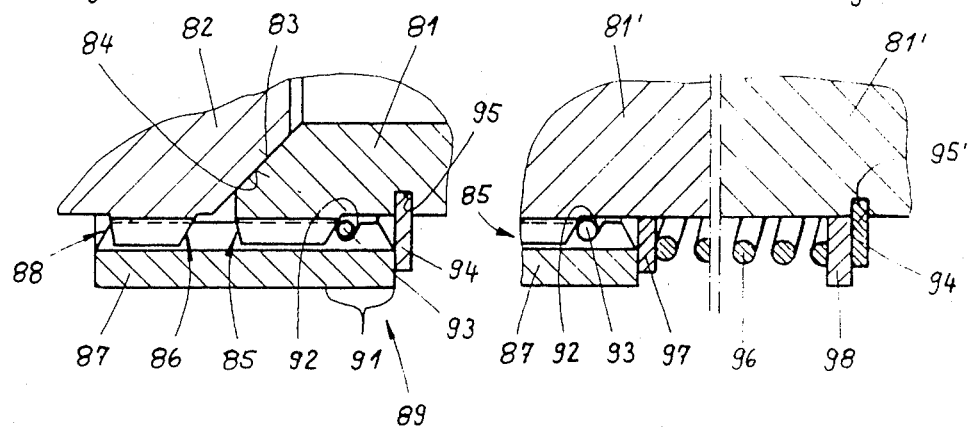
Fig. 6
Fig. 7

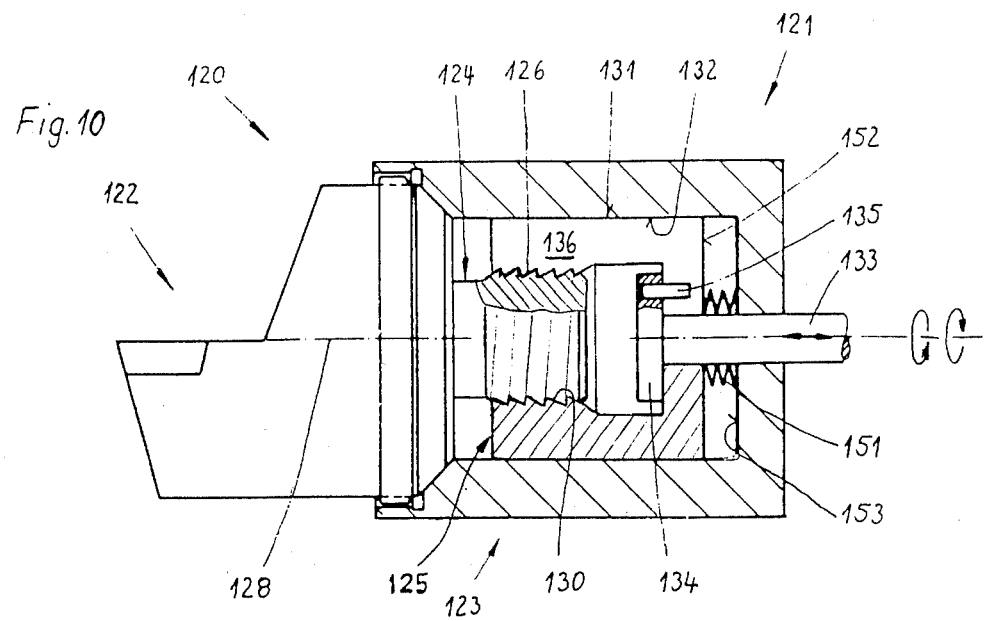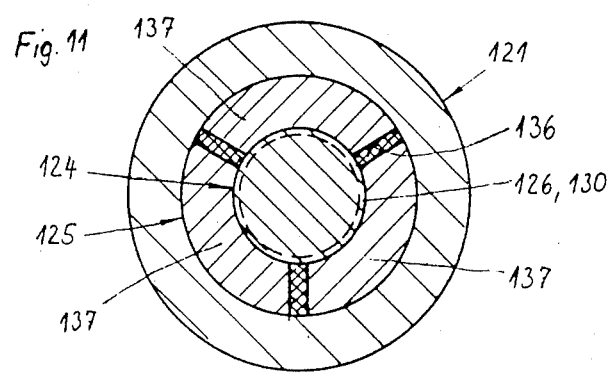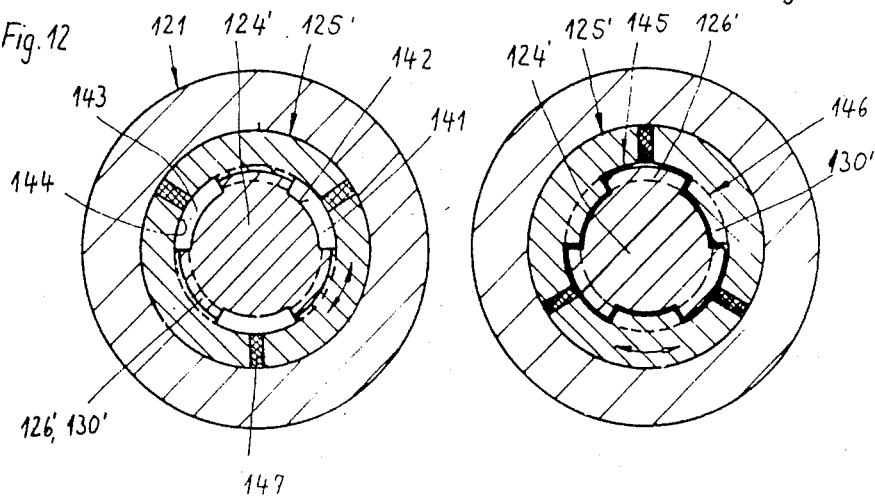

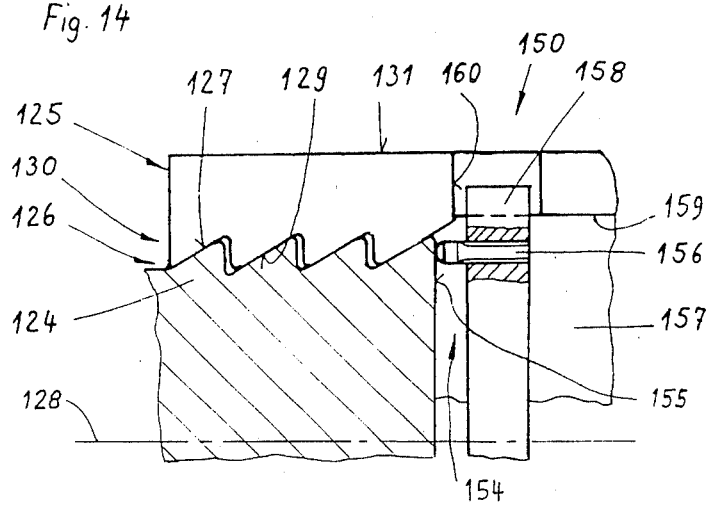
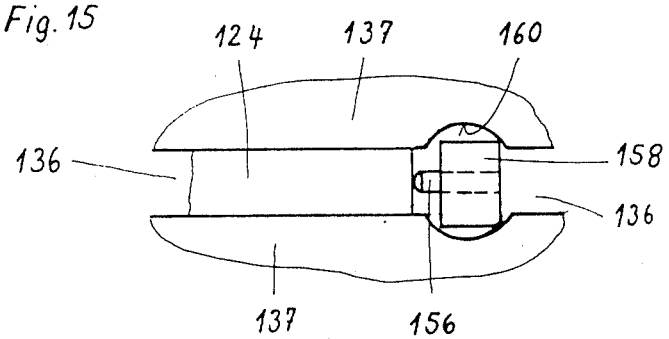
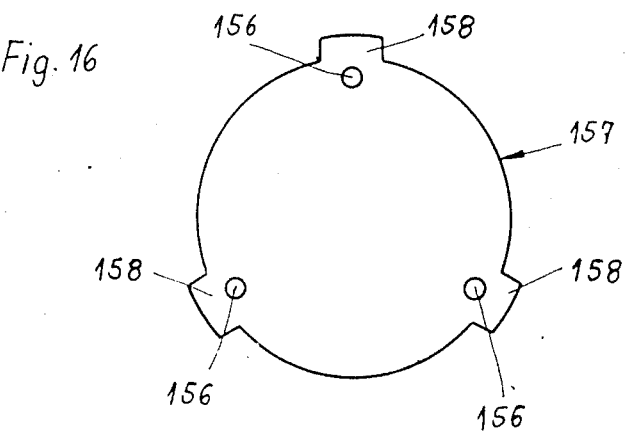

CUTTING TOOL WITH INTERCHANGEABLE TOOL HEAD FOR MACHINE TOOLS

BACKGROUND OF THE INVENTION

1. Field of the Invention

The present invention relates to cutting tools for surface shaping machine tools and, more particularly, to a cutting tool assembly with a tool holder and an interchangeable tool insert.

2. Description of the Prior Art

In connection with machine tools for the surface shaping of workpieces with cutting tools, where these tools have a certain minimal size and, as a rule, have carbide-tipped metal or ceramic cutting edges, efforts are being made to provide cutting tool assemblies which can be separated at a given separation point into a tool insert which carries the cutting edge and a tool holder by means of which the tool assembly is attachable to the machine tool. The two components of these tool assemblies are attachable to each other by means of a coupling device. It thereby becomes possible to replace highly stressed cutting edges with new ones, or to change from a given cutting edge shape to a different shape more quickly and easily, as compared to compact tools.

The coupling devices of these separable tool assemblies feature cooperating positioning and abutting faces on the tool insert and on the tool holder. They include a clamping mechanism with a traction rod which is movable in relation to the tool holder and operably connected to a traction rod drive, the traction rod being attachable to the tool insert, in order to clamp the latter against the tool holder.

A known example of a separable turning tool assembly features prismatic positioning and abutting faces on the separation point between the tool holder and the tool insert. The traction rod has a cylindrical traction head of a keyhole-shaped contour which engages a recess in the tool insert with a matching keyhole-shaped contour, the recess being open on its short side. This prior art example allows for the tool insert to be connected to the tool holder in only one particular orientation. The coupling and separation of the tool insert and tool holder takes place on a movement path which is perpendicular to the longitudinal axis of the tool shaft. As a result, the range of application of such a tool is limited, especially when, in the course of a machining operation on a workpiece, the main cutting forces fluctuate in size and direction.

Another known separable tool assembly has partially cylindrical positioning and abutting faces at its point of separation. These faces form a ring-cylindrical collar on the tool insert and a stepped cylindrical extension on the tool holder which fits into the collar of the tool insert. These faces thereby transmit the axial and radial cutting forces. Tangential forces are transmitted by means of a radially oriented key-and-groove connection in the area of the planar end face. The coupling device also includes several clamping bolts which are arranged for movement inside outwardly and rearwardly inclined bores and cooperate with an annular wedge on the extremity of the traction rod which forces them outwardly into contact with a taper on the inside of the collar of the tool insert. The inclined orientation of the clamping bolts produces a partially axial and partially radial clamping action. The radial clamping forces act on the interface between the cylindrical faces of the collar on the tool insert and on the extension of the tool holder, so that the wall thickness of the collar cannot be reduced at will. It follows that the radial distance of the clamping faces of the clamping bolts from the longitudinal axis of the tool assembly is comparatively short, so that this coupling device is capable of withstanding only comparatively small bending forces.

Still another known example of a separable tool assembly suggests the arrangement of the positioning and abutting faces on the separation point in the form of planar radial serrations (so-called Hirth serrations). The coupling device includes a clamping shaft which is attached to the tool insert and has coupling faces which form part of a truncated cone. On the inside of the tool holder is arranged a clamping collet with jaws that are guided in part on conical and in part on cylindrical guide faces and have interior contact faces which cooperate with the conical faces of the clamping shaft. A closing movement of the clamping collet, produced by the traction rod, causes the collet to move against the clamping shaft so as to clamp the two planar radial serrations against each other, while simultaneously clamping the clamping shaft in the radial sense. The planar radial serrations transmit axial, radial and tangential forces from the tool insert to the tool holder. The radial orientation of the teeth of the planar radial serrations limits the transmission of radial forces to those teeth which are oriented transversely to the direction of force. Due to the fact that the flanks of those theeth which are not oriented parallel to the direction of force are inclined in relation to the a radial plane, the transmission of a radial force or of a transverse force creates a not inconsiderable axial force component. The transmission of tangential forces likewise produces a considerable axial force component. Because the cutting edge on the tool insert is normally arranged out of center, often at a considerable distance from the tool axis, the axial components of these forces add up to considerable force levels on one side. An axial force component tends to separate the planar radial serrations. This axial force component, therefore, must additionally be absorbed by the clamping device.

SUMMARY OF THE INVENTION

Underlying the present invention is the objective of providing a separable tool assembly which, on the one hand, offers a great variety of application possibilities and, on the other hand, provides more favorable conditions of force transmission at the separation point than the known separable tool assemblies.

This objective is attained with a tool assembly which includes the features listed in claim 1.

Due to the fact that a portion of the positioning and abutting faces is in the form of truncated conical faces, it is possible, on the one hand, to obtain a positioning engagement of the two tool assembly components on a large surface which provides excellent absorption of the radial forces and of those axial forces which are directed toward the separation point. This applies even more so, because the truncated conical faces are simple faces of rotation which can be machined with high precision, thus making it possible to use materials of high resistance, particularly of high surface hardness, the faces lending themselves to finishing in a grinding operation. The fact that the other portion of the positioning and abutting faces is in the form of coupling faces which are oriented parallel to the tool axis makes it possible, on the other hand, for the elevated tangential forces which resulting from a laterally offset position of the cutting edge to be transmitted without reaction against the first-mentioned portions of the positioning and abutting faces. This signifies, among other things, that the truncated conical positioning and abutting faces are not required to transmit any frictional forces in the tangential sense, so that there exists complete freedom to adapt them to the specific requirements of transmitting axial and radial forces, in terms of their location, orientation and dimensions. The separate transmission of the tangential forces by the second positioning and abutting faces also means that the clamping device is not affected by this force transmission.

A configuration of the tool assembly with the features of claim 2 has as its result that the tool inserts, which are frequently removed from the tool holder and then deposited on metallic tool magazine seats or the like, carry the more compact conical portion which is less susceptible to dents and damage. This arrangement and handling mode reduces the risk of damage to the conical part of the tool holder which remains mounted on the machine tool.

A configuration of the tool assembly in accordance with claim 3 makes it possible, due to the radially distant position of the truncated conical surfaces to reduce the radial component of a predetermined surface area to a comparatively small portion of the radial extent of the overall cross-sectional area, so that a comparatively large cross-sectional area is left for the other parts of the assembly. This measure, in addition, creates a comparatively large countermoment from the axial clamping force of the clamping shaft on the positioning face on any one side of the truncated cone.

With a configuration of the tool assembly in accordance with claim 4, it is possible to achieve particularly favorable clamping conditions for the clamping shaft, in both the axial and radial sense.

A configuration of the tool assembly in accordance with claim 5 provides for the truncated conical positioning and abutting surfaces to be at least approximately tangentially aligned with the point of clamping support of the clamping shaft, which can be viewed as a clamped cantilever-type beam, with the result that a force transmission under unfavorable geometric relationships is avoided.

In a configuration of the tool assembly in accordance with claim 6, the faces for the transmission of tangential forces, especially when regularly spaced, allow for a simplified and less expensive machining operation on these force transmitting faces. In addition, it becomes possible to obtain a greater variability of the angular alignment of the two tool assembly components relative to each other. By arranging the tool assembly in accordance with claim 7 or claim 8, it is possible to achieve a further cost reduction in the machining of the tangential force transmission surfaces, because it is possible to employ conventional cutting tools, on conventional machine tools, in conventional machining operations.

Claim 9 provides for the tangential force transmitting surfaces of the tool assembly to be arranged on both assembly components in such a way that the force transmitting surfaces on one component form the counterpart of the force transmitting surfaces on the other component. This makes it possible to obtain a direct coupling engagement of the two assembly components.

In a configuration of the tool assembly in accordance with claim 10, both tool assembly components have the same type of tangential force transmitting surfaces so that, under certain circumstances, it is possible to to use the same tools for the machining of both. The fact that the two assembly components are connected to each other, i.e. coupled together, by virtue of their coupling profiles engaging a coupling sleeve with a corresponding counter-profile, results in a limited radial adjustability of the tangential coupling configuration, so that, even in the presence of certain manufacturing tolerances in the dimensions of the tangential force transmitting surfaces, no negative effect whatsoever need be feared from these tolerances on the positioning of the tool assembly components by means of the truncated conical positioning and abutting faces. Through the use of a hub spline profile on each of the two tool assembly components and of a shaft spline profile on the coupling sleeve, it becomes possible to arrange all the elements of the tangential coupling on the inside of the two components in a space-saving configuration. This also makes it possible to move the truncated conical positioning and abutting faces all the way to the periphery of the tool assembly components, for the greatest possible radius of engagement.

In a configuration of the tool assembly in accordance with claim 11, the coupling sleeve remains in place inside one of the two assembly components, preferably inside the tool holder. In this case, the number of coupling sleeves required does not exceed the number of tool holders. A configuration of the tool assembly in accordance with claim 12 provides a simple and easily obtainable attachment of the coupling sleeve. By arranging the bores for the attachment pin in the coupling sleeve and in the tool assembly component as throughbores, it is possible to remove the attachment pin, if necessary, by driving it to the inside of the particular assembly component for the removal of the coupling sleeve from the assembly component.

A configuration of the tool assembly with the features of claim 13 is likewise very easy to manufacture and to operate. This applies particularly to a configuration having a coupling sleeve which is arranged on the outside of the tool assembly. This makes it possible to use of a further feature, defined in claim 14, which provides for the use of a spring, whereby the coupling sleeve is rendered axially yielding. This means that, when a new tool insert is to be attached, the coupling sleeve is first pushed rearwardly by hand or with the aid of the tool insert, until the truncated conical positioning and abutting faces are in contact with each other and until the tool insert has been moved to the correct angular position in the circumferential sense. In the same convenient way, it is possible to change a previously chosen angular position of the tool insert, following a minimal release movement of the clamping device, by retracting the coupling sleeve sufficiently far to the rear, in opposition to the spring, and by rotating the tool insert to the desired new angular position, before releasing the coupling sleeve.

A configuration of the tool assembly in accordance with claim 15 provides a clamping device which requires comparatively little space in the radial sense, so that it can be accommodated inside tool holders of comparatively small exterior dimensions, without impairment to its radial clamping action or to its axial pulling action. Furthermore, this clamping device has axially aligned cylindrical guide faces on the outer side of the clamping collet and in the bore of the tool holder, which guide faces are important—in conjunction with the conical faces of the clamping collet and of the clamping shaft—for an accurate and even clamping action on the clamping shaft, the aligned cylindrical guide faces being machinable in a single setup of the particular part and in a continuous machining operation, in order to obtain the best possible correspondence of their geometrical relationships. This assures a precise parallel alignment of the clamping jaws of the clamping collet with the tool axis, even in the presence of manufacturing tolerances in the diameter or radius of the cylindrical guide faces.

A configuration of the tool assembly in accordance with claim 16 has no conical guide faces between the clamping collet and the tool holder. Their guide faces are matching continuous cylindrical faces. The elimination of the conical guide faces and of the associated radial movement space for the clamping jaws of the clamping collet creates a more compact clamping device, in terms of its radial dimensions. The eliminated movement space and the reduced radial dimensions of at least some of the components of the clamping device can be taken advantage of in the form of reduced outer dimensions of the tool assembly, or in the form of radially increased dimensions and correspondingly higher strength of some of the parts of the clamping device, or in the form of a combination of both. The elimination of the conical guide faces in this configuration means that the first axial movement phase of the clamping collet along its conical guide faces is likewise eliminated. Because there is permanent contact between the continuous cylindrical guide faces, a large portion of the second movement phase, required for the establishment of a sufficient radial overlap in the case of separate cylindrical guide faces, is likewise eliminated. And, since the clamping jaws actually require a comparatively small axial displacement for the clamping of the clamping shaft, it becomes possible to arrange the conical coupling faces between the clamping shaft and the clamping collet in comparatively close succession in the axial sense, with the result that a larger number of conical coupling faces can be arranged within a given axial space and/or the length portion with the conical coupling faces can be made comparatively short. This feature, in combination with the reduction of the axial movement space for the clamping collet, makes for a clamping device which is also very compact in the axial sense. A configuration of the tool assembly in accordance with claim 17 offers the same advantages as just mentioned. The increased rotational movement is at least partially compensated for by an increase in the share of the overlapping face portions on the conical coupling faces, thus allowing for a further axial shortening of the clamping device. A modification in accordance with claim 18 makes it possible to again achieve the advantages of a quick-action coupling with short rotational movements, with the possibility of compensating for the reduction of overlap through a corresponding increase in the number of thread courses.

A configuration of the tool assembly in accordance with claim 19 makes it possible to transmit the radial component of the clamping forces generated between the clamping shaft and the clamping collet directly to the cylindrical guide face of the tool holder.

Configurations of the tool assembly in accordance with claim 20 or claim 21, respectively, provide an especially effective clamping action on the clamping shaft.

A configuration of the tool assembly in accordance with claim 22 facilitates the engagement between the conical coupling faces of the clamping shaft and clamping collet in the circumferential sense, due to the automatic establishment of relative axial positions of the two parts in which they are aligned "tooth-to-gap" in the circumferential sense. A modification in accordance with claim 23 represents a simple mechanical way of achieving this result.

A configuration of the tool assembly in accordance with claim 24 provide an easily manufactured rotating device for those configurations of the tool assembly which require a rotational movement for the coupling action.

A configuration of the tool assembly in accordance with claim 25 provides a precisely centered and at the same time very deep connection between the clamping shaft and the tool holder. The latter is further enhanced through a modification in accordance with claim 26, according to which the clamping shaft and the tool insert provide an additional precise radial positioning engagement at a point which is axially spaced from their truncated conical positioning and abutting faces. These advantages become more prevalent in a modification in accordance with claim 27, whereby the saw-tooth threads produce no radial forces at all in the particular direction of pull.

BRIEF DESCRIPTION OF THE DRAWINGS

In the following, the invention will be described in more detail with reference to several embodiments which are are represented in the drawings, where:

FIG. 3 shows an enlarged detail of the tool assembly of FIG. 1;

FIG. 4 shows a partial cross section of the tool assembly of FIG. 1;

FIG. 5 shows a partial cross section of a modified embodiment of the tool assembly;

FIG. 6 shows a partial longitudinal section of another embodiment of the tool assembly;

FIG. 7 shows a partial longitudinal section of still another embodiment of the tool assembly;

FIG. 10 shows, partially in a lateral view and partially in a longitudinal section, still another embodiment of the tool assembly;

FIG. 11 shows a cross section of the tool assembly of FIG. 10;

FIGS. 12 and 13 each shows a cross section of the tool assembly of FIG. 10, as partially modified;

FIG. 14 shows an enlarged detail of the longitudinal section shown in FIG. 10;

FIG. 15 shows the detail of FIG. 14 in a developed plan view;

FIG. 16 shows a portion of the tool assembly of FIG. 14 in a frontal view;

DETAILED DESCRIPTION OF THE PREFERRED EMBODIMENTS

Figure 1:
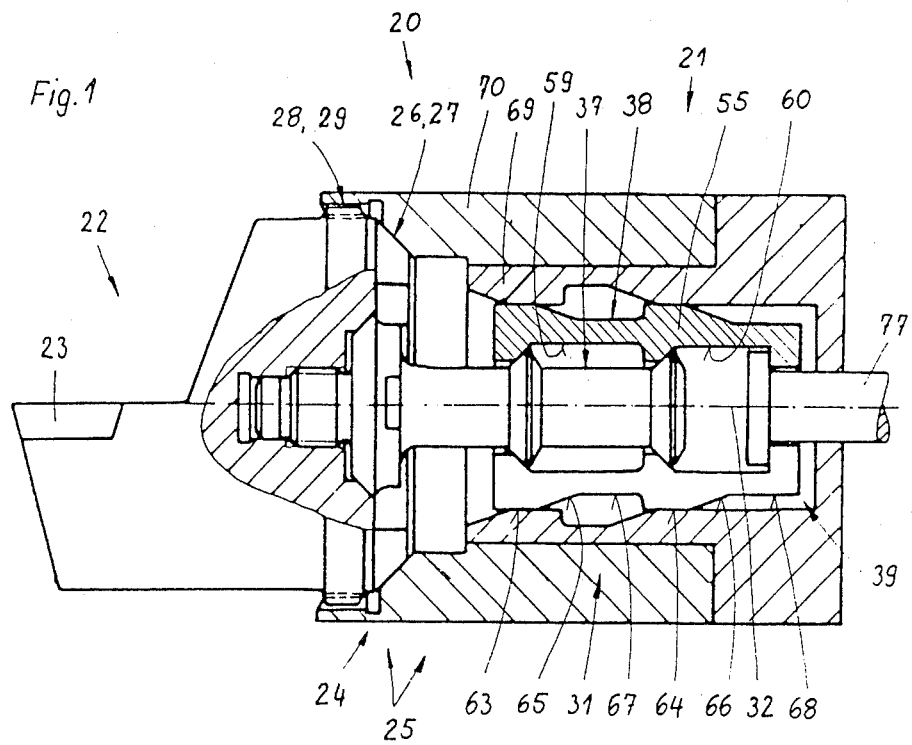
FIG. 1 shows, partially in a lateral view and partially in a longitudinal section, a first embodiment of the tool assembly of the invention in its clamped or operating position.
Figure 2:
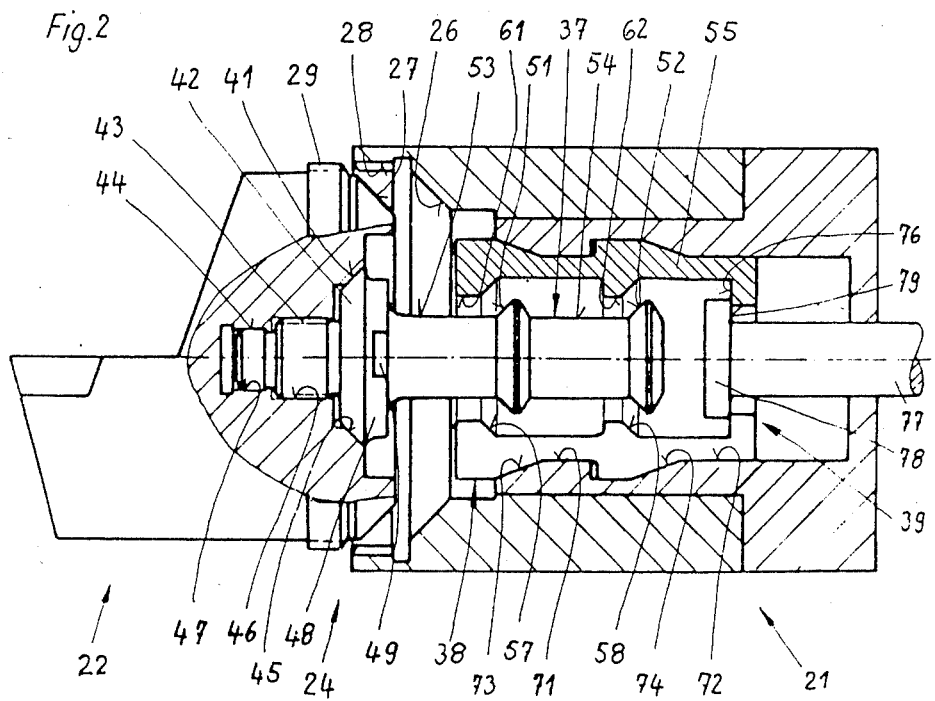
FIG. 2 shows the lateral view or the longitudinal section, respectively, of the tool assembly of FIG. 1 in its released position.

The tool assembly 20 which is illustrated in FIGS. 1 and 2 is used as a cutting tool for turning or boring operations. It consists of two main components, a tool holder 21 and a tool insert 22. The tool holder 21 serves for the attachment of the tool assembly 20 to a machine tool, not shown. Those structural features of the tool holder 21 which depend on the type and structure of the particular machine tool, as well as the required mounting elements, are likewise not shown. The tool insert 22 carries a cutter body which, in the following, will be simply referred to as the cutting edge 23 and which is shown in the drawing to be a carbide-tipped cutting edge soldered to the tool insert 22.

The tool assembly 20 is a separable assembly. The tool holder 21 and the tool insert 22 part at a separation point 24. In the clamped condition, which is the operating condition (FIG. 1), the two main components of the assembly are connected to each other by means of a coupling device 25.

The coupling device 25 encompasses two sets of positioning and abutting faces, a first set of positioning and abutting faces 26 and 27 and a second set of positioning and abutting faces 28 and 29 (FIG. 2), cooperating faces being arranged on the tool holder 21, on the one hand, and on the tool insert 22, on the other hand. The coupling device 25 includes a clamping device 31. The positioning and abutting faces 26 . . . 29 and the clamping device 31 with its component parts are arranged in centered alignment with a common center axis 32 of the tool holder 21 and tool insert 22.

The first set of positioning and abutting faces 26 and 27 consists of matching truncated conical faces which are arranged in the area of the opposing end faces of the two main components of the assembly, being located within at least approximately the same radial range. The face 26 on the tool holder 21 is in the form of a truncated conical recess. The face 27 on the tool insert 22 is in the form of a matching conical bevel. The two truncated conical faces 26 and 27 define an included cone angle of between 60° and 120°. The choice of this angle is determined by, among other things, the ratio at which radial and axial forces are generated. When the radial forces predominate, a smaller cone angle is more favorable and, conversely, when the axial forces predominate, a large cone angle is more favorable. The two truncated conical faces 26 and 27 on the two main components 21 and 22 are arranged in a radial range which is located as far from the common axis 32 as possible, in order to obtain the largest possible moment arm. The radial extent of the truncated conical faces 26 and 27 is determined by the magnitude of the forces which are to be transmitted, within the limits of the maximum permissible specific surface pressure, and in consideration of the inevitably occurring elastic deformation. Within these requirements, the truncated conical faces 26 and 27 are reduced to as small a radial extent as possible, so that, with pre-established exterior dimensions of the two main components of the assembly, a maximum amount of space is available for the remaining components, especially the components of the clamping device 31.

The second set of positioning and abutting faces 28 and 29 serve as tangential force transmitting faces. These tangential force transmitting faces are in the form of tooth flanks 33 and 34 of the teeth 35 and 36 of a regular spline coupling (FIG. 4). The radially inwardly extending spline teeth 35 with their tooth flanks 33 on the tool holder 21 are part of a hub spline, and the radially outwardly extending teeth 36 with their tooth flanks 34 on the tool insert 22 form a matching shaft spline.

In the place of the regular spline coupling, it is also possible to utilize as tangential coupling faces 28' and 29' the flanks of a regular multi-groove profile of the type which is shown in FIG. 5.

The clamping device 31 includes a clamping shaft 37, a clamping collet 38, and a traction device 39 which operates the clamping collet 38.

The clamping shaft 37 is removably attached to the tool insert 22, being precisely centered in relation thereto. For this purpose, the clamping shaft 37 is provided with a truncated conical face (positioning cone) 41 which is arranged at the periphery of a positioning collar 42 at a certain axial distance from the inner extremity of the clamping shaft 37. Adjoining the positioning collar 42 in the direction of its inner extremity is a threaded shank 43. The threads of the threaded shank 43 are of the sawtooth-type, having a flank which is oriented approximately perpendicularly to the common axis 32, while facing away from the tool insert 22. Adjoining the threaded shank 43 is a cylindrical centering extension 44. The tool insert 22 has corresponding bore portions which match the shape of the clamping shaft 37. They include a truncated conical face (conical positioning recess) 45, adjoined by a threaded bore portion 46 and a last bore portion in the form of a centering bore 47. On the axially opposite side of the positioning cone 41 of the positioning collar 42 is arranged a cylindrical collar portion 48 which has two or more facet 49 which serve to firmly screw the clamping shaft 37 into the tool insert 22.

On the clamping shaft 37 are arranged two conical coupling faces 51 and 52, at an axial distance from the point of attachment to the tool insert 22. The conical coupling faces 51 and 52 are in the form of truncated conical faces, having identical inner and outer diameters. The included cone angle is comprised between 45° and 90° and is preferably 60°. A line extending perpendicularly from the conical coupling faces 51 and 52 defines a radial component which is directed outwardly and an axial component which is directed toward the tool insert 22, two lines extending perpendicularly from the two conical coupling faces 51 and 52 being parallel to each other. It should be noted that, where, in connection with surfaces of rotation, parameters are given about the orientation of a perpendicularly extending line and reference is made to the vector orientation of a line extending perpendicularly from another face or surface, or to the arrangement of certain components, it is to be understood that these parameters refer to a common section plane, particularly a common longitudinal section plane, which is normally the same as the plane of the drawing.

The two conical coupling faces 51 and 52 on the clamping shaft 37 are arranged at a predetermined axial distance from each other. Adjoining the smaller diameter of the coupling faces is an intermediate surface portion 53 or 54, respectively. The intermediate surface portion 53 extends from the conical coupling face 51 to the vicinity of the point of attachment to the tool insert, 22 and the intermediate surface portion 54 extends from the conical coupling face 52 to the rear side of the conical coupling face 51. The rear sides of both clamping faces are normally likewise truncated conical faces, but the latter are inclined to define an included cone angle which is much more obtuse than the cone angle of the conical coupling faces 51 and 52.

The clamping collet 38, which is arranged inside the tool holder 21, has a number of clamping jaws 55 which are formed by longitudinal slots in the collet body. They are held together by means of elastically compressible spring elements which are arranged in the longitudinal slots (FIGS. 11 and 12) and bonded to the clamping jaws 55, preferably with a molded or vulcanized bond, or attached thereto by means of an adhesive. It should be noted that, where parameters are given in connection with the configuration of the clamping collet 38, particularly in connection with the arrangement, orientation, or dimensions of its constituent elements, these parameters are to be understood to refer to the several clamping jaws 55 with the assumption that their relative positions are the same as prior to the segmentation of the clamping collet body.

The clamping collet 38 is, at first approximation, a hollow cylindrical structure. On its inner side, it has two conical coupling faces 57 and 58 in the form of truncated conical faces. Lines extending perpendicularly from these faces define vectors which are opposite to lines extending perpendicularly from the conical coupling faces 51 and 52 of the clamping shaft 37. The conical coupling faces 57 and 58 have identical inner and outer diameters which are slightly larger than the corresponding diameters of conical coupling faces 51 and 52 of the clamping shaft 37. The conical coupling faces 57 and 58 also have the same axial spacing as the conical coupling faces 51 and 52 of the clamping shaft 37. Furthermore, they are so arranged on the clamping collet 38 that, in the clamped condition (FIG. 1), the are positioned substantially within the same axial range as the conical coupling faces 51 and 52 of the clamping shaft 37, while abutting against the latter.

Adjoining the outer radius of the conical coupling faces 57 and 58, on the side which faces away from the tool holder 21, are two cylindrical intermediate surface portions 59 and 60, respectively, of an axial extent which is somewhat larger than the maximum axial displacement of the clamping collet 38 between its clamped position (FIG. 1) and its released position (FIG. 2). Adjoining the inner radius of the conical coupling faces 57 and 58 in the opposite axial direction are two more cylindrical intermediate surface portions 61 and 62, respectively. The intermediate surface portion 61 extends to the forward extremity of the clamping collet 38. The intermediate surface portion 62 extends as far as the radial plane in which the radially further outwardly located intermediate surface portion 59 terminates, so that a more or less annular transition shoulder is formed.

The clamping collet 38 has on its outer side two cylindrical guide faces 63 and 64 and two conical guide faces 65 and 66 (FIG. 1). The cylindrical guide faces 63 and 64 have identical outer radii. Each of the two conical guide faces 65 and 66 adjoins one of the two cylindrical guide faces 63 and 64 on the side which is more distant from the tool insert 22, the two conical guide faces 65 and 66 forming converging tapers. Accordingly, lines extending perpendicularly from the conical guide faces 65 and 66 have a radial component which is oriented outwardly and an axial component which is oriented away from the tool insert 22. Two lines extending perpendicularly from the conical guide faces 65 and 66 are parallel to each other. The two conical guide faces 65 and 66 have substantially the same radial extent which is slightly larger than the radial extent of the two conical coupling faces 51 and 52. At their smaller radii, the two conical guide faces 65 and 66 are adjoined by two surface portions 67 and 68, respectively. The intermediate surface portion 67 extends axially as far as the edge of the adjacent cylindrical guide face 64. The surface portion 68 extends to the rear extremity of the clamping collet 38.

For each of the exterior guide faces 63 . . . 66 on the clamping collet 38, the tool holder 21, which forms part of the clamping device 31, has a matching interior guide face. The interior guide faces are arranged in the bore of a sleeve-like collet guide 69 of the tool holder 21 which is attached to the holder base 70 of the tool holder 21 in a way which is not shown. The holder base 70 is of tubular appearance, the truncated conical recess 26 being arranged at its forward extremity.

The interior guide faces include two cylindrical guide faces 71 and 72 and two conical guide faces 73 and 74. The cylindrical guide faces 71 and 72 have the same inner diameter which is at least approximately equal to twice the outer radius of the exterior cylindrical guide faces 63 and 64 on the clamping collet 38. Each of the two conical guide faces 73 and 74 adjoins a cylindrical guide faces 71 and 72 on its side which faces towards the tool insert 22, forming a diverging taper. Lines extending perpendicularly from the latter are parallel to each other, having at least approximately the opposite vector orientation from lines extending perpendicularly from the exterior conical guide faces 65 and 66 of the clamping collet 38. The interior conical guide faces 73 and 74 on the collet guide 69 have a radial extent which is larger than the radial extent of the conical coupling faces 51 and 52 on the 37. The smaller radii of the conical guide faces 73 and 74 are approximately identical to the large radii of the conical guide faces 65 and 66 on the clamping collet 38.

The conical guide face 74 is adjoined by an intermediate surface portion 75 extending in the direction of tool insert 22 as far as the radial plane which coincides with the proximate edge of the cylindrical guide face 71.

The junction points on the collet guide 69 between each of the two interior cylindrical guide faces 71 and 72 and its associated conical guide face 73 or 74, respectively, have the same axial spacing as the junction points on the clamping collet 38 between the exterior cylindrical guide faces 63 and 64 and its associated adjoining conical guide face 65 or 66, respectively. It follows that, when the clamping collet 38 executes an axial movement, its clamping jaws 55 execute movements parallel to themselves, either along the cylindrical guide faces or along the truncated conical guide faces.

On its extremity facing away from the tool insert 22, the clamping collet 38 has a wall and on the inside of the latter an annular abutment face 76 facing toward the tool insert 22. The abutment face 76 is oriented perpendicularly to the common axis 32, forming part of the traction device 39. The latter includes, as an additional component, a traction rod 77 which is connected, or connectable, to a clamping drive. The traction rod 77 is located in the common center axis 32. One extremity of the traction rod 77 extends to the interior of the clamping collet 38, where it forms a traction head 78 with an annular abutment shoulder 79 which faces away from the tool insert 22. In each position of the clamping collet 38, the abutment shoulder 79 of the traction head 78 and the cooperating abutment face 76 of the clamping collet 38 occupy at least in part the same radial range.

The components of the tool assembly 20 which are described hereinabove cooperate as follows:

For a removal of the tool insert 22 from the tool holder 21, the traction rod 77 is pushed into the tool holder 21 to its forward position (FIG. 2). As a result of this movement, entrainment means (not shown) push the clamping collet 38 into its release or disengagement position which is shown in FIG. 2. The clamping jaws 55 of the clamping collet 38 thereby move initially with their exterior cylindrical guide faces 63 and 64 along the of the collet guide 69. As a result, the conical coupling faces 57 and 58 of the clamping collet 38 move away from their counter-faces, the conical coupling faces 51 and 52, in the axial direction. In a second portion of the axial movement of the clamping collet 38, the conical guide faces 65 and 66 of its clamping jaws 55 move along the interior conical guide faces 73 and 74 of the collet guide 69 such a distance forwardly and also radially outwardly that the surface portions 67 and 68 of the clamping collet 38 engage the intermediate surface portions 61 and 62 of the collet guide 69. In this second portion of the axial movement of the clamping collet 38, the clamping jaws 55 are separated by means of spring members to such an extent that their interior conical coupling faces 57 and 58 are positioned radially outside the axial movement path of the conical coupling faces 51 and 52 of the clamping shaft 37. This makes it possible to withdraw the clamping shaft 37 from the clamping collet 38 and from the tool holder 21 in an axial movement in which the truncated conical positioning and abutting faces 26 and 27 separate from each other and, after a short further movement of the tool insert 22, the positioning and abutting faces 28 and 29 disengage. As soon as the clamping shaft 37 is completely disengaged from the clamping collet 38, it can be removed from the tool assembly 20.

In the reverse movement sequence in connection with the engagement of a tool insert 22, the latter is moved in its last portion of approach in as near an axial alignment with the common axis 32 as possible towards the tool holder 21, so that its leading clamping shaft 37 can enter the cavity of the clamping collet 38. A short distance before reaching the axial end position of the tool insert 22, the shaft spline profile of the tool insert 22, formed by its positioning and abutting faces 29, enters the hub spline profile of the tool holder 21, formed by the positioning and abutting faces 28 of the latter. When the axial end position of the tool insert 22 is reached, its conical bevel 27 engages the truncated conical recess 26 of the tool holder 21, thereby centering the tool insert 22 in relation to the tool holder 21. This position of the tool insert 22 can be seen in FIG. 1.

An actuation of the traction device 39 causes the traction rod 77 to move away from the tool insert 22 in the axial direction, thereby moving the clamping collet 38 from its release position (FIG. 2) to its clamping position (FIG. 1). In the course of this displacement, the clamping jaws 55 move initially axially as well as radially inwardly, for as long as the conical guide faces 65 and 66 and the conical guide faces 73 and 74 slide along each other. As a result, the conical coupling faces 57 and 58 of the clamping collet 38 move along a surface line of a cone toward the common axis 32, until they reach the same radial range as the conical coupling faces 51 and 52 of the clamping shaft 37. A small clearance in both the axial direction and the radial direction remains between the various interior faces of the clamping collet 38 and the opposing exterior faces of the clamping shaft 37. In the second portion of their clamping movement, the clamping jaws 55 execute a purely axial movement in the direction of their clamping position, until their conical coupling faces 57 and 58 engage the conical coupling faces 51 and 52. An increase in the pulling force on the traction rod 77 causes the conical coupling faces 57 and 58 of the clamping jaws 55 to execute a small relative displacement on the conical coupling faces 51 and 52 of the clamping shaft 37 in the direction of their common surface line, so that the radial clearance between the outer cylindrical guide faces 63 and 64 of the clamping jaws 55 and the interior cylindrical guide faces 71 and 72 of the collet guide 69 is eliminated and the clamping jaws 55 exert radial clamping force components toward the inside against the clamping shaft 37 and toward the outside against the collet guide 69, in addition to exerting an axial clamping force component.

In the following will be described embodiments of the tool assembly which contain modifications in connection with the location and/or configuration of the tangential coupling faces.

The embodiment which can be seen in FIG. 6, includes, as before, a truncated conical recess on the tool holder 81 and a matching conical bevel on the tool insert 82 defining cooperating positioning and abutting faces 83 and 84 which serve to axially and radially connect the two tool assembly components. The tool holder 81 and the tool insert 82 have tangential force transmitting surfaces 85 and 86, respectively, which are in the form of shaft profiles on both tool assembly components. Preferably, however, the tangential force transmitting surfaces 85 and 86 are formed by the flanks of a regular spline profile. Both shaft profiles are identical with respect to the profile dimensions of their spline connections. An additional coupling member in the form of a coupling sleeve 87 is used to establish the coupling engagement of the two axially adjacent shaft profiles. The coupling sleeve 87 has a bore with tangential force transmitting surfaces 88 which form a hub profile which matches the shaft profiles of the tangential force transmitting surfaces 85 and 86.

The coupling sleeve 87 is retained on one of the two tool assembly components, preferably on the tool holder 81, by means of a sleeve retaining device 89. As part of this device, the coupling sleeve 87 has on its side facing away from the tool insert 82 a end portion 91 projecting axially beyond the tangential force transmitting surfaces 85 of the tool holder 81. On the inside of this end portion 91, in the radial area of its tangential force transmitting surfaces 88, is arranged a circumferential groove 92 which holds a snap ring 93 of circular cross section. Because the circumferential groove 92 of the coupling sleeve 87 is located in the radial area of the hub profile with the tangential force transmitting surfaces 88, the snap ring 93 engaged in the circumferential groove 92 also occupies the radial range of the shaft profile with the tangential force transmitting surfaces 85 of the tool holder 81. The end face of the shaft profile 85 facing away from the tool insert 82, the snap ring 93, and the flank of the circumferential groove 92 in the hub profile 88 which faces toward the tool insert 82, together form an axial abutment for the coupling sleeve 87 which is effective in the direction toward the tool insert 82. In the opposite direction, an axial abutment for the coupling sleeve 87 is produced by a retaining ring 94 which is seated in a matching circumferential groove 95 on the outer side of the tool holder 81.

The embodiment of the tool assembly which is illustrated in FIG. 7 differs from the embodiment shown in FIG. 6 with respect to a portion of the retaining device for the coupling sleeve 87.

The abutment of the coupling sleeve 87 which is effective in the direction toward the tool insert 82 is again provided by a circumferential groove 92 into which is engaged a wire snap ring 93 which cooperates with the shaft profile 85. The circumferential groove 95' and a retaining ring 94 are arranged at a certain axial distance from the extremity of the coupling sleeve 87. Between the coupling sleeve 87 and the retaining ring 94 is arranged a compression spring 96 which is guided on the outer diameter of the tool holder 81', the extremities of the compression spring 96 bearing against the near end face of the coupling sleeve 87 and against the retaining ring 94, through the intermediary of two pressure discs 97 and 98, respectively. This configuration of the retaining device gives the coupling sleeve 87 a firm abutment in the direction toward the tool insert 82 and an elastically yielding support in the opposite direction.

Figure 8:
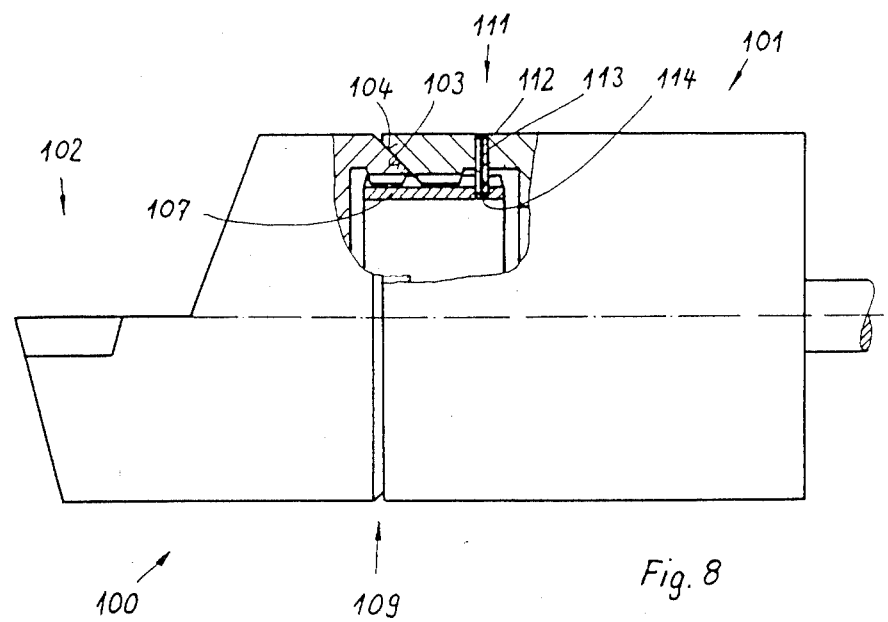
FIGS. 8 and 9 show a partially sectioned lateral view of still another embodiment of the tool assembly in its clamped position and its released position, respectively.
Figure 9:
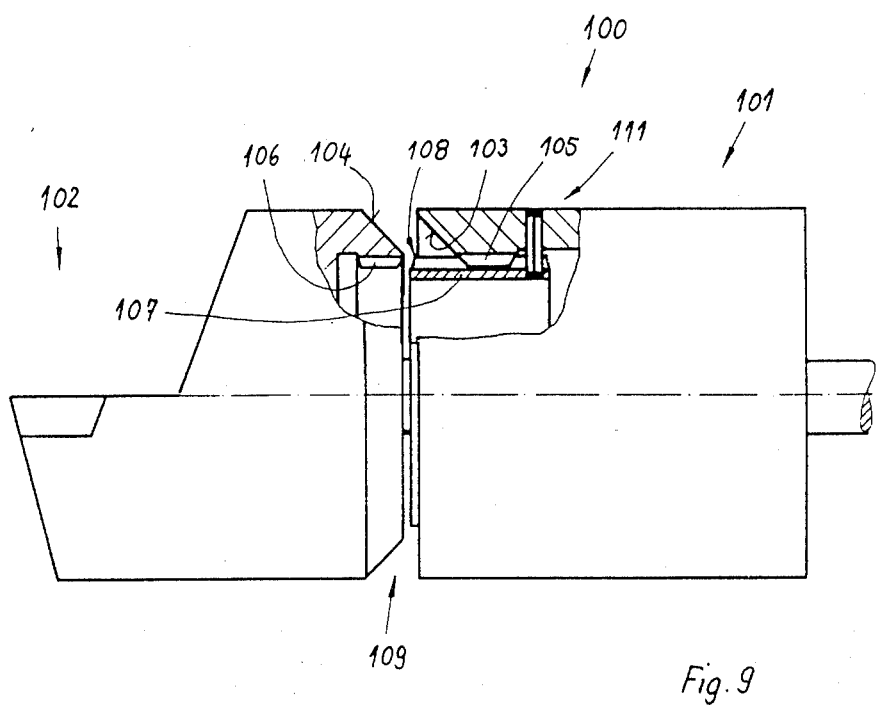

In the embodiment of the tool assembly 100 which can be seen in FIGS. 8 and 9, the tool holder 101 and the tool insert 102 are again in axial and radial abutment at two truncated conical positioning and abutting faces 103 and 104. For the tangential force transmission, both the tool holder 101 and the tool insert 102 have on their inner side a hub spline profile with tangential force transmitting surfaces 105. These hub profiles, which are identical with respect to their profile dimensions and their radial range, are coupled together by means of a coupling sleeve 107 which carries a matching shaft spline profile with tangential coupling faces 108. This arrangement of the tangential force transmission on the inside makes it possible for the tool holder 101 and the tool insert 102 to have a smooth outer contour in the area of the separation point 109.

The sleeve retaining device which is also desirable in connection with this embodiment of a tangential coupling could have a configuration which is similar to that of the sleeve retaining device which is shown in FIG. 6, whereby it would be possible to utilize an interior shoulder of the tool holder 101 as an abutment for the coupling sleeve 107. A modified embodiment of the sleeve retaining device 111, which can be seen in FIGS. 8 and 9, features a retaining pin 112. It further includes a cylindrical throughbore 113 in an exterior wall portion of the tool holder 101 and a likewise cylindrical throughbore 114 in the coupling sleeve 107. The two throughbores 113 and 114 are radially aligned. They are arranged in longitudinal portions of the tool insert 102 and of the coupling sleeve 107 which are located axially beyond the hub profile with the tangential force transmitting surfaces 105. The throughbore 113 and the outer diameter of the retaining pin 112 are preferably so coordinated that they form a seating fit. The throughbore 114 in the coupling sleeve 107 is slightly larger, so as to form a sliding fit, or preferably a fit with clearance. While the coupling sleeve 107 is thus axially retained by the retaining pin 112, it does not prevent the coupling sleeve 107 from adjusting the position of its shaft spline in a radial and tangential sense in relation to the hub splines of the tool holder 101 and the tool insert 102.

If the need exists, the tool insert 102 can be pushed to the inside of the tool holder 101 from the outside, in order to remove the coupling sleeve 107 from the tool holder 101. For this reason, it is preferable to choose for the retaining pin 112 an elastic pin. Where it is anticipated that the coupling sleeve 107 is removed only rarely from the tool holder 101, one may also consider the use of grooved pins.

In the following will be described still another embodiment with a modified clamping device, with reference to FIGS. 10 through 12.

The tool assembly 120 has its tool holder 121 and its tool insert 122 coupled together at their opposing end faces in one of the previously described configurations, using truncated conical positioning and abutting faces and tangential force transmitting surfaces.

The clamping device 123 comprises a clamping shaft 124 and a clamping collet 125. The clamping shaft 124 is attached to the tool insert 122 in the same manner as described further above. For the purpose of coupling the clamping shaft 124 to the clamping collet 125, the clamping shaft 124 has a cylindrical male thread 126 (FIG. 4). The thread flank which faces toward the tool insert 122 serves as the coupling face 127 of the clamping shaft 124. Its angle of inclination from the common axis 128 is comprised between 22.5° and 45°, preferably at least approximately 30°. The other thread flank has a much larger angle of inclination, approximately 3°, for example, as is common in the case of sawtooth threads. The coupling face 129 of the clamping collet 125 is formed by a thread flank facing away from the tool insert 122 and forming part of a cylindrical female thread 130 which cooperates with the male thread 126 of the clamping shaft 124.

The clamping collet 125 is connected to a collet rotating device transmitting a rotary movement to the clamping collet 125 through the intermediary of the traction rod 133 and its traction head 134, for example. For this purpose, the traction head 134 carries drive pins 135 which are engaged in the slots 136 between two adjacent clamping jaws 137 of the clamping collet 125.

A tool assembly 120', representing a partially modified and partially identical tool assembly 120, can be seen in FIGS. 12 and 13, FIG. 10 representing a substantially corresponding longitudinal section. Parts being at least partially identical and parts which are modified are designated by identical reference numerals to which an apostrophe is added for distinction.

The clamping shaft 124' has longitudinal grooves 141 which extend parallel to the common axis 128. They extend from the free extremity of the clamping shaft 124' in the direction of the tool insert 122, beyond the last thread of the male thread 126'. The bottom 142 of the these longitudinal grooves 141 has a radial distance from the common axis 128 which is less than one-half the minor diameter of the male thread 126'. The longitudinal grooves 141 are regularly spaced along the circumference, their circumferential extent being at least approximately equal to the entire circumference divided into twice the number of longitudinal grooves.

On the inner side of the clamping collet 125' are likewise arranged longitudinal grooves 143 which are similarly oriented toward the common axis 128. They extend from the extremity of the clamping collet 125 in the direction away from the tool insert 122, beyond the last thread of the male thread 126' of the clamping shaft 124'. Their bottom 144 has a radial distance from the common axis 128 which is larger than the major diameter of the male thread 126' of the clamping shaft 124'. The longitudinal grooves 143 are likewise arranged at a regular circumferential spacing matching that of the longitudinal grooves 141 of the clamping shaft 124'. Their circumferential extent is somewhat larger than the circumferential extent of the circumferential portions 145 of the male thread 126' with coupling faces 129' which remain on the clamping shaft 124 between its longitudinal grooves 141. In view of the fact that the circumferential portions 145 of the male thread 126' are based on a smaller radius than the corresponding circumferential portions 146 of the female thread 130', it is advantageous to make the bottom 142 of the clamping shaft 124 narrower than the longitudinal grooves of 125'. This will have the result of approximately equalizing the mechanical stressability of the circumferential portions 145 on the clamping shaft 124' and of the circumferential portions 146 on the clamping collet 125'.

The slots 136' of the clamping collet 125' are located in the same circumferential area as the longitudinal grooves 143, preferably in the center of the latter. The spring members 147 of the clamping jaws 137' which are located in the slots 136' are arranged so as not to protrude inwardly into the longitudinal grooves 143.

The insertion of the threads on the circumferential portions 145' of the male thread 126' into the thread gaps on the circumferential portions 146 of the female thread 130' can be facilitated through the use of an insertion device 150 as can be seen in FIGS. 14 through 16.

The insertion device 150 includes a compression spring 151 arranged between the end face 152 of the clamping collet 125' facing away from the tool insert 122 and an axially oppositely facing end wall 153 of the tool holder 121. The compression spring 151 is preferably constituted of a set of spring washers which are guided on the traction rod 133. The insertion device 150 also includes, in axial alignment with each longitudinal groove 143 of the clamping collet 125', an abutment 154. The latter is arranged in the path of that portion of the clamping shaft 124' which carries the coupling face 127' and which is positioned in the axial sense at the point at which the load-free thread flank 155 of the first thread of the male thread 126' just touches the abutment 154 when the circumferential portions 145 of the threads of the clamping collet 125' are aligned for the insertion of the thread gaps on the circumferential portions 146 of the female thread 130'. It follows that the coupling face 127 of the clamping shaft 124' and the coupling face 129 of the clamping collet 125' are likewise in insertion alignment. A rotation the clamping collet 125' causes the coupling face 129 and the coupling face 127 of the clamping collet 125' to move circumferentially past each other, so as to establish an axial coupling engagement.

The abutments 154 are formed by threaded pins 156 which are seated in threaded bores of the abutment disc 157. The abutment disc 157 has an outer diameter which is smaller than twice the inner radius of the female thread 130'. It includes a number of radial noses 158 equal to the number of longitudinal grooves 143 on the clamping collet 125', the threaded bores for the threaded pins 156 being arranged in the radial noses 158. The radial extent of the noses 158 is slightly larger than the radius at the interior face 159 adjoining the female thread 130'. Immediately adjacent to the interior extremity of the female thread 130', within the area of the slots 136', are arranged openings 160, their axial and tangential dimensions being so coordinated with those of the radial noses 158 that the radial noses 158 fit into the openings 160 and are axially positioned therein. The radial overlap between the radial noses 158 and the openings 160 is chosen to be no greater than the amount by which the clamping jaws 137' can be radially spread apart, as a result of the deformability of the elastically yielding members arranged between them. In cases where this overlap is inadequate, it is possible to replace the integral radial noses 158 on the abutment disc 157 with firmly seated pins, such as grooved pins or elastic pins, or threaded pins engaged in suitable radial bores of the abutment disc 157. A greater radial overlap is obtainable in this way.

The insertion device 150 cooperates with the clamping device 123' in such a way that, following the abutment of the first thread flank 157 or of its radially inwardly adjoining end face of the clamping shaft 124', the clamping collet 125' is pushed back a small distance, in opposition to the compression spring 151. Its coupling faces 129' thereby remain in tangential alignment with the coupling faces 127' of the clamping shaft 124'. Following the coupling engagement of the coupling faces 127' and 129', the clamping collet 125' and its clamping shaft 124' are pulled completely into their coupling position by the traction rod 133. The comparatively weak compression spring 151 yields sufficiently in the process.

A further modified embodiment of the tool assembly is obtained, if, in the clamping device 123" with its longitudinal grooves 141 and 143, the coupling faces 127 of the clamping shaft 124" and the coupling faces 129" of the clamping collet 125' are in the shape of truncated conical faces which have the same profile in longitudinal section (FIG. 14) as the circumferential portions 145 and 146 with their male thread 126' and female thread 130', respectively, all other features remaining substantially unchanged. The previously made statements apply accordingly. The clamping device 123" likewise lends itself advantageously for the use of the insertion device 150.

Figure 17:
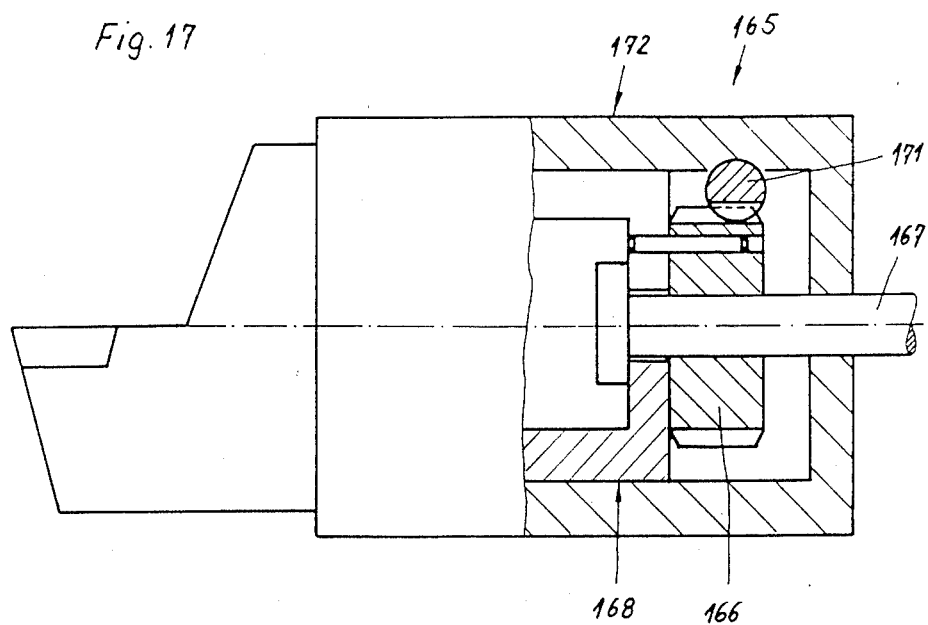
FIG. 17 shows, partially in a lateral view and partially in a longitudinal section, still another embodiment of the tool assembly.
Figure 18:
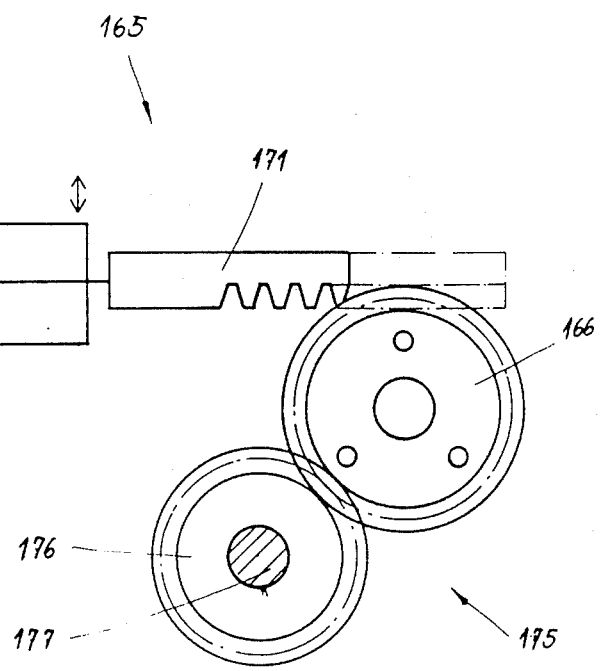
FIG. 18 shows, in a schematic frontal view, components of the tool assembly of FIG. 17.

FIGS. 17 and 18 show two different devices for the rotation of the clamping collet. In the embodiment of FIG. 17, the collet rotating device 165 includes a gear 166 which is rotatably supported on the traction rod 167 of the particular clamping device. The gear 166 is tangentially coupled to the clamping collet 168 by means of several drive pins 169 which are seated in axially oriented cylindrical throughbores of the gear 166, reaching axially into the slots between two adjacent clamping jaws of the clamping collet 168. In parallel alignment with a tangential plane to the teeth of the gear 166 is arranged a rack 171 which is guided for longitudinal movements in the tool holder 172. Connected to the rack 171, either inside or outside the tool holder 172, is a linear drive 173 in the form of a pneumatic or hydraulic cylinder assembly, for example. In the place of the latter can also be used a threaded drive spindle with a rotary drive motor.

When the rack 171 is in its rest position outside the teeth of the gear 166, the gear 166 and those parts which are rotationally connected thereto can be freely rotated, or, alternatively, moved to a predetermined angular position by means of another rotating device. As a result of the operation of the linear drive 173, the rack 171 moves over a predetermined distance, engaging the teeth of the gear 166 and rotating the latter over a corresponding angle. However, if the rack 171 is so structured and arranged that it remains in permanent engagement with the gear 166, the latter can no longer be freely rotated and can only execute those rotational movements which are produced by the rack 171.

FIG. 18 shows a second collet rotating device 175. The latter includes a gear 176 in permanent engagement with the gear 166 which is rotationally coupled with the associated clamping collet 168. The traction rod 167 is connected to a rotational drive, which is not shown, by means of a gear shaft 177, the operation of the rotational drive being capable of rotating the clamping collet by means of the gear 176 and the gear 166 over a predetermined angle or also over several turns, as may be necessary with a clamping device where the clamping shaft and the clamping collet are coupled together by means of a thread.

It should be understood, of course, that the foregoing disclosure describes only preferred embodiments of the invention and that it is intended to cover all changes and modifications of these examples of the invention which fall within the scope of the appended claims.

I claim the following:

1. A separable tool assembly for surface shaping by cutting, having the following features:
    the assembly includes a tool holder (21) adapted for attachment to a machine tool,
    the assembly further includes a tool insert (22) with a cutting edge (23),
    the tool holder (21) and the tool insert (22) are separable at a separation point (24), and
    connectable together by means of a coupling device (25),
    the coupling device (25) includes matching positioning and abutting faces (26, 27; 28, 29) arranged in part on the tool holder (21) and in part on the tool insert (22) in central alignment with a common axis (32),
    the coupling device (25) includes a clamping device (31) in central alignment with the common axis (32),
    the clamping device (31) includes a clamping shaft (37),
    which is connected to the tool insert (22), and
    which is equipped with one or more conical coupling faces (51, 52) of which a line extending perpendicularly therefrom has a radially outwardly oriented component and an component directed toward the tool insert (22) whereby, in the case of several coupling faces (51, 52), said perpendicularly extending lines being parallel to each other,
    the clamping device (31) includes a clamping collet (38) which has several longitudinal slots subdividing it into clamping jaws (55) which are held together by means of spring members (56),
    the clamping collet (38) is arranged inside the tool holder (21),
    the clamping collet (38) has in its bore one or more conical coupling faces (57, 58) so oriented that a line extending perpendicularly therefrom is oriented oppositely to said line extending perpendicularly from the conical coupling faces (51, 52) of the clamping shaft (37) and which are located, in at least the clamping position, at least partially in the same axial range and in the same radial range as the conical coupling faces (51, 52) of the clamping shaft (37), while abutting thereagainst,
    the clamping shaft (37) has on its radially outer side at least one conical guide face (65, 66),
    clamping shaft (37) has on its side facing away from the tool insert (22) in its bore a flat, annular abutment face (76) so oriented that a line extending perpendicularly therefrom is oriented parallel to the common axis (32),
    the clamping device (31) includes a traction rod (77) which is connectable or connected to a power drive and which is aligned with the common axis (32) and extends to the inside of the clamping collet (38),
    the traction rod (77) includes a traction head (78) on the extremity which extends to the inside of the clamping collet (38),
    which includes an annular abutment shoulder (79) facing away from the tool insert (22) which is located at least partially in the same radial range as the abutment face (76) of the clamping collet (38),
    the clamping device (31) includes for each outer conical guide face (65, 66) on the clamping collet (38) an inner conical guide face (73, 74),
    which is arranged in a bore of the tool holder (21) or in a bore of a collet guide (69) which is attached thereto, and
    which is located in the same axial range in at least a certain portion of the axial movement range of the outer conical guide face (65, 66) of the clamping collet (38) and
    which is so oriented that a line extending perpendicularly therefrom is oriented oppositely to a line extending perpendicularly from the outer conical guide face (65, 66) of the clamping collet (38),
characterized by the following features:
    as a first set of positioning and abutting faces (26, 27), the tool holder (21) and the tool insert (22) have matching truncated conical faces (26, 27) which are located at least approximately in the same radial range,
    as a second set of positioning and abutting faces, the tool holder (21) and the tool insert (22) have tangential force transmitting faces (28, 29) which are arranged in pairs and located in at least approximately the same radial range and, in the clamping position, also located in at least approximately the same axial position, and
    which are in the form of flat faces and/or cylindrical faces which themselves or their surface lines are oriented parallel to the common axis (32), and
    which are so oriented that a line extending perpendicularly thereto has at least a tangential component, i.e. at least one such component in either of the two circumferential directions.

* * * * *